(12) United States Patent
Sumiyama et al.

(10) Patent No.: US 7,780,311 B2
(45) Date of Patent: Aug. 24, 2010

(54) MULTI-WAVELENGTH LIGHT SOURCE DEVICE

(75) Inventors: Fumika Sumiyama, Matsumoto (JP); Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 12/201,880

(22) Filed: Aug. 29, 2008

(65) Prior Publication Data
US 2009/0122531 A1 May 14, 2009

(30) Foreign Application Priority Data
Nov. 13, 2007 (JP) .............................. 2007-294316

(51) Int. Cl.
*F21V 9/00* (2006.01)
(52) U.S. Cl. .................... 362/231; 362/249.02
(58) Field of Classification Search .............. 362/231, 362/236, 237, 249.02, 555
See application file for complete search history.

(56) References Cited
U.S. PATENT DOCUMENTS
2007/0159581 A1 * 7/2007 Moriya ....................... 349/117

2008/0273123 A1 * 11/2008 Morikawa et al. ........... 348/757

FOREIGN PATENT DOCUMENTS
| JP | A-2004-503923 | 2/2004 |
| WO | WO 02/05038 A2 | 1/2002 |

* cited by examiner

*Primary Examiner*—David V Bruce
(74) *Attorney, Agent, or Firm*—Olif & Berridge, PLC

(57) ABSTRACT

A multi-wavelength light source device includes three light source devices. The light source device includes a plurality of light emitting elements, and a dispersing section making wavelengths of light beams emitted from the respective light emitting elements different from each other, a spectral line width of the emitted light beam in each of the light source devices is equal to or greater than 0.2 nm, a wavelength of the red light beam in the light source device for emitting the red light beam is greater than 612 nm, a wavelength of the green light beam in the light source device for emitting the green light beam is greater than 525 nm and smaller than 538 nm, and a wavelength of the blue light beam in the light source device for emitting the blue light beam is greater than 465 nm and smaller than 468 nm.

11 Claims, 13 Drawing Sheets

MULTI-WAVELENGTH LIGHT SOURCE DEVICE

BACKGROUND

1. Technical Field

The present invention relates to a multi-wavelength light source device for emitting a plurality of light beams composed of, for example, red light, green light, and blue light.

2. Related Art

In recent years, coherent light sources have become essential to image display devices, the optical communication field, the medical field, and the measurement field including microscopes. However, laser sources have a disadvantage of having coherency. According to this disadvantage, since an interference light appears on a projection surface on which the laser beam is projected as the speckle noise, some countermeasures to the speckle noise becomes necessary in order for displaying a high-resolution image.

Therefore, as a method of removing the speckle noise, it has been proposed to arrange a plurality of light emitting elements having center wavelengths slightly different from each other as design values in an array arrangement (see e.g., JP-T-2004-503923, the term "JP-T" as used herein means a published Japanese translation of a PCT patent application). In such a laser source, reduction of the speckle noise is achieved by differentiating the center wavelengths to increase the spectral line width.

However, also in the laser source of the related art described above, it is still expected to surely provide a wide color gamut as a feature of the laser sources while reducing the speckle noise.

SUMMARY

Various embodiments provide a multi-wavelength light source device capable of reducing coherency between the laser beams while keeping the wide color gamut as a feature of laser sources.

A multi-wavelength light source device of one embodiment includes three light source devices for respectively emitting a red light beam, a green light beam, and a blue light beam, the light source device includes a plurality of light emitting elements, and a dispersing section that makes wavelengths of light beams emitted from the respective light emitting elements different from each other, a spectral line width of the emitted light beam in each of the light source devices is equal to or greater than 0.2 nm, a wavelength of the red light beam in the light source device for emitting the red light beam is greater than 612 nm, a wavelength of the green light beam in the light source device for emitting the green light beam is greater than 525 nm and smaller than 538 nm, and a wavelength of the blue light beam in the light source device for emitting the blue light beam is greater than 465 nm and smaller than 468 nm.

According to this embodiment, by making the spectral line width no smaller than 0.2 nm, an effect of reducing the speckle noise can sufficiently be obtained. Further, by making the wavelength of the red light beam greater than 612 nm, the wavelength of the green light beam greater than 525 nm and smaller than 538 nm, and the wavelength of the blue light beam greater than 465 nm and smaller than 468 nm, a sufficiently large color gamut can be obtained. Specifically, the speckle contrast drops as the spectral line width is increased, and by making the spectral line width no smaller than 0.2 nm, the speckle contrast is sufficiently lowered. Further, by making the wavelength of the red light beam greater than 612 nm, the wavelength of the green light beam greater than 525 nm and smaller than 538 nm, the wavelength of the blue light beam greater than 465 nm and smaller than 468 nm, the color gamut of the standard RGB (sRGB) and the color gamut of the National Television Standards Committee (NTSC) can be covered. Therefore, the sufficiently large color gamut can be obtained.

Further, in the multi-wavelength light source device according to one embodiment, it is preferable that the spectral line width of the emitted light beam in each of the light source devices is equal to or greater than 0.5 nm.

According to this embodiment, since the speckle contrast is dramatically reduced in the area of the spectral line width of up to about 0.5 nm, by making the spectral line width no smaller than 0.5 nm, the effect of reducing the speckle noise can more surely be obtained.

Further, in the multi-wavelength light source device according to one embodiment, it is preferable that the spectral line width of the emitted light beam in each of the light source devices is equal to or greater than 1.0 nm.

According to this embodiment, by making the spectral line width no smaller than 1.0 nm, with which value of the characteristic of the speckle contrast becomes in the saturated state, the effect of reducing the speckle noise can more surely be obtained.

Further, in the multi-wavelength light source device according to one embodiment, it is preferable that the wavelength of the red light beam in the light source device for emitting the red light beam is greater than 612 nm and smaller than 658.5 nm.

According to this embodiment, by making the wavelength of the red light beam smaller than 658.5 nm, it can be prevented that the white balance between the light source devices for respectively emitting the red light beam, the green light beam, and the blue light beam becomes difficult to obtain.

Further, in the multi-wavelength light source device according to one embodiment, it is possible that the dispersing section includes a wavelength selection element having a plurality of light entrance areas where the light beams emitted from the light emitting elements enter respectively, and for selectively reflecting a part of a light beam with a predetermined selection wavelength out of each of the light beams, which are emitted from the respective light emitting elements, towards the respective light emitting elements, and transmitting the rest of each of the light beams, which are emitted from the respective light emitting elements, and the selection wavelengths in the respective light entrance areas are different from each other.

According to this embodiment, by making the selection wavelengths in the respective light entrance areas different from each other, the spectral line width of the emitted light beam can be increased. Specifically, only the light beams with the predetermined selection wavelength out of the light beams emitted from the respective light emitting elements are reflected by the wavelength selection element. Further, the light beams reflected by the wavelength selection element are amplified by resonance between the light emitting elements and the wavelength selection element. Therefore, the light beam emitted from one of the light emitting elements and transmitted through the wavelength selection element becomes a light beam in a narrow band having the selection wavelength as the center thereof. On this occasion, since the selection wavelengths are made different from each other, the light beams emitted respectively from the light emitting elements and transmitted through the wavelength selection element become the light beams having the respective selection wavelengths different from each other as the center wavelengths. Therefore, the spectral line width of the light beam emitted from the wavelength selection element is broadened as a whole.

Further, in the multi-wavelength light source device according to one embodiment, it is possible that the dispersing section includes a state changing section that makes the selection wavelengths different from each other.

According to this embodiment, the selection wavelengths in the respective light entrance areas are made different from each other by changing the state, such as the temperature, of the wavelength selection element. Thus, the selection wavelengths in the respective light entrance areas are controlled.

Further, in the multi-wavelength light source device according to one embodiment, it is possible that the wavelength selection element has a wavelength selection film different in film thickness between the light entrance areas.

According to this embodiment, the selection wavelengths are made different from each other by making the thickness of the wavelength selection film.

Further, in the multi-wavelength light source device according to one embodiment, it is possible that the dispersing section includes a wavelength conversion element having a plurality of light entrance areas where the light beams emitted from the light emitting elements enter respectively, and for converting a certain wavelength of each of the light beams, which are emitted from the respective light emitting elements, into a predetermined conversion wavelength, and emitting a light beam with the conversion wavelength together with the light beam with the rest of the wavelengths, and a wavelength selection element for selectively reflecting a part of the light beam with the conversion wavelength out of the light beam, which is emitted from the wavelength conversion element, towards the respective light emitting elements, and transmitting the rest of the light beam, which is emitted from the wavelength conversion element, and the conversion wavelengths in the respective light entrance areas are different from each other.

According to this embodiment, by making the conversion wavelengths in the respective light entrance areas different from each other, the spectral line width of the emitted light beam can be increased. Specifically, a part of the light beam emitted from each of the light emitting elements is converted in the wavelength conversion element into a light beam with a predetermined conversion wavelength, and then emitted therefrom. Further, the rest of the light beam emitted from each of the light emitting elements is emitted therefrom without converted in the wavelength conversion element into a light beam with a predetermined conversion wavelength. Further, the light beam with the wavelength not converted into the predetermined conversion wavelength out of the light beams emitted from the wavelength conversion element is reflected by the wavelength selection element. Further, the light beam reflected by the wavelength selection element is wavelength-converted by the wavelength conversion element while resonating between the light emitting element and the wavelength selection element. Therefore, the light beam emitted from one of the light emitting elements and transmitted through the wavelength selection element becomes a light beam in a narrow band having the conversion wavelength as the center thereof. On this occasion, since the conversion wavelengths are made different from each other, the light beams emitted respectively from the light emitting elements and transmitted through the wavelength selection element become the light beams having the respective conversion wavelengths different from each other as the center wavelengths. Therefore, the spectral line width of the light beam emitted from the wavelength selection element is broadened as a whole.

Further, in the multi-wavelength light source device according to one embodiment, it is possible that the wavelength conversion element has repeated structures of domains with polarization inverted to each other along optical axes of the light beams emitted from the respective light emitting elements, and the widths of the domains in the optical axis direction are different between the light entrance areas from each other.

According to this embodiment, the conversion wavelengths in the respective light entrance areas are made different from each other by making the widths of the domains different from each other.

Further, in the multi-wavelength light source device according to one embodiment, it is preferable that the dispersing section includes a state changing section that makes the conversion wavelengths different from each other.

According to this embodiment, the widths of the domains in the optical axis direction in the respective light entrance areas are made different from each other by changing the state, such as the temperature, of the wavelength conversion element. Thus, the conversion wavelengths in the respective light entrance areas are controlled.

Further, in the multi-wavelength light source device according to one embodiment, it is preferable that the wavelength conversion element has repeated structures of domains with polarization inverted to each other along optical axes of the light beams emitted from the respective light emitting elements, and the widths of the domains in the optical axis direction in the respective light entrance areas are identical to each other.

According to this embodiment, since the widths of the domains are made identical to each other, manufacturing of the wavelength conversion element becomes easy.

BRIEF DESCRIPTION OF THE DRAWINGS

Embodiments are described with reference to the accompanying drawings, wherein like numbers reference like elements.

DESCRIPTION OF EXEMPLARY EMBODIMENTS

Figure 1:
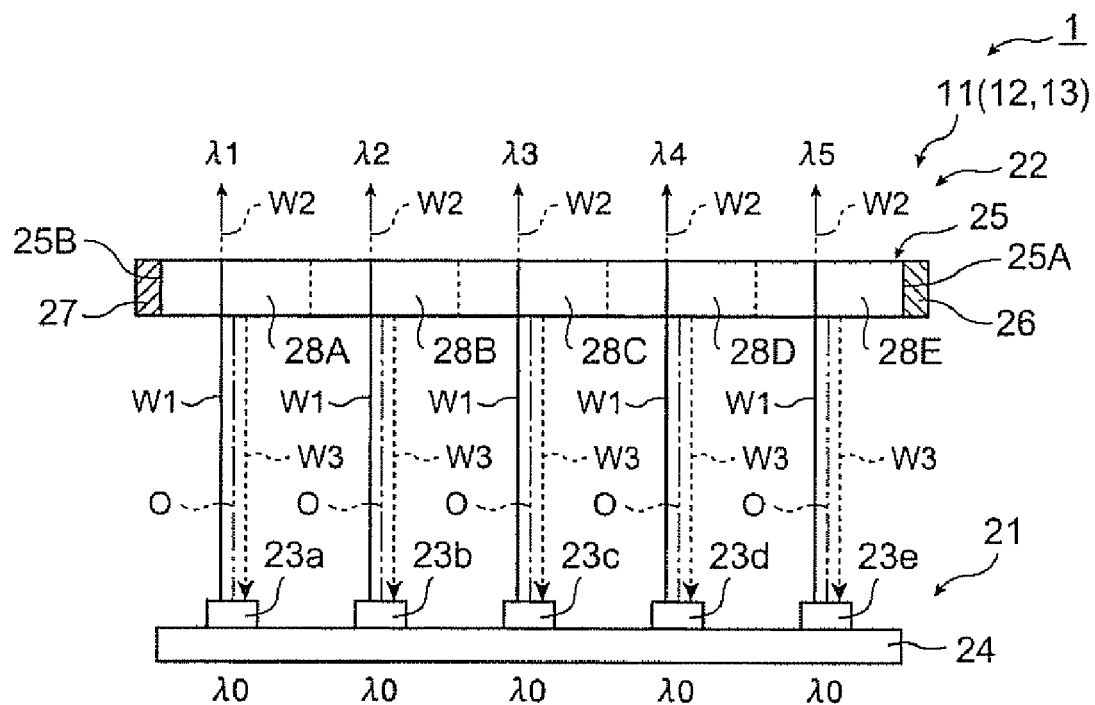
FIG. 1 is a schematic configuration diagram showing a light source device forming a multi-wavelength light source device.

A multi-wavelength light source device as an embodiment of the invention will hereinafter be explained with reference to the accompanying drawings. It should be noted that the scale size of each member is accordingly altered so that the member can be shown large enough to be recognized in the drawings used in the following descriptions. Here, FIG. 1 is a schematic configuration diagram showing a light source device forming the multi-wavelength light source device.

Multi-Wavelength Light Source

The multi-wavelength light source device 1 according to the present embodiment is provided with three light source devices 11 through 13 for emitting colored light beams of red, green, and blue, respectively. It should be noted that since the light source devices 11 through 13 have substantially the same configurations, only the configuration of the light source device 11 will be described in the following explanations.

As shown in FIG. 1, the light source device 11 for emitting the red light is provided with a light emitting section 21 and a dispersing section 22.

The light emitting section 21 is provided with a plurality of light emitting elements 23a through 23e and a support member 24 for supporting the light emitting elements 23a through 23e.

The light emitting elements 23a through 23e are each formed of an external cavity surface emitting laser such as a vertical external cavity surface emitting laser (VECSEL). Further, the light emitting elements 23a through 23e are disposed linearly along one direction in this order, and have the respective optical axes O in parallel to each other. Here, the wavelengths of the light beams respectively emitted from the light emitting elements 23a through 23e are all set to λ0 for example.

The dispersing section 22 is provided with a wavelength selection element 25, a piezoelectric element (a state changing section) 26, and an absorption member 27.

The wavelength selection element 25 is formed of, for example, a hologram element provided with a periodic lattice, and disposed on the optical axes of the light emitting elements 23a through 23e.

Further, the wavelength selection element 25 reflects a part W3 of the light with a predetermined wavelength (selection wavelength) out of the light W1 entering the wavelength selection element 25, and at the same time, transmits the rest W2 of the light W1, thus functioning as a resonance mirror in cooperation with the light emitting elements 23a through 23e. Further, the wavelength selection element 25 has a configuration of reflecting the light between the wavelength selection element 25 and each of the light emitting elements 23a through 23e, thereby resonating the light with the selection wavelength reflected by the wavelength selection element 25.

Therefore, the intensity of the light with the selection wavelength generated by the resonance between each of the light emitting elements 23a through 23e and the wavelength selection element 25 dramatically increases in comparison with the intensity of the light with the other wavelengths. Therefore, the light emitted from the wavelength selection element 25 can be regarded as the light with a substantially single wavelength. It should be noted that the wavelength selection element 25 reflects almost all (about 98% through 99%) of the light with the selection wavelength, and emits a part (about 1% through 2%) of the light with the predetermined wavelength as the light W2.

Further, the wavelength selection element 25 is provided with light entrance areas 28A through 28E where the light beams emitted respectively from the light emitting elements 23a through 23e enter. In other wards, the light beam emitted from the light emitting element 23a enters the light entrance area 28A, the light beam emitted from the light emitting element 23b enters the light entrance area 28B, the light beam emitted from the light emitting element 23c enters the light entrance area 28C, the light beam emitted from the light emitting element 23d enters the light entrance area 28D, and the light beam emitted from the light emitting element 23e enters the light entrance area 28E.

Since the light emitting elements 23a through 23e corresponding respectively to the light entrance areas 28A through 28F are linearly arranged in one direction perpendicular to the optical axis O, the light entrance areas 28A through 28E are similarly arranged along the one direction. It should be noted that the light entrance areas 28A through 28E are actually continuous areas in which the selection wavelength and the temperature vary gradually, and consequently have no physical boundaries therebetween.

The piezoelectric element 26 is provided to an end surface 25A (the end surface near to the light entrance area 28E) along the one direction in the wavelength selection element 25. The piezoelectric element 26 is made of a piezoelectric ceramics or a piezoelectric crystal such as quartz crystal, $PbTiO_3$ (lead titanate), $PbZrO_3$ (lead zirconate), or $BaTiO_3$ (barium titanate), and is displaced in response to application of a voltage.

The absorption member 27 is bonded to the other end surface 25B (the end surface near to the light entrance area 28A) in the wavelength selection element 25 to be fixed thereto.

Therefore, the wavelength selection element 25 is distorted along one direction when pressurized on the end surface 25A by the piezoelectric element 26. On this occasion, an amount of the distortion of the wavelength selection element 25, which varies in accordance with a position in the wavelength selection element 25, becomes the largest on the end surface 25A provided with the piezoelectric element 26, and reduces as the position moves towards the end surface 25B. Here, since the intervals of the periodic structure are reduced in accordance with compressing pressure applied thereto, the wavelengths of the light beams W2 transmitted through the wavelength selection element 25 vary to be shorter wavelengths as the compression pressure increases.

As described above, the piezoelectric element 26 provides the wavelength selection element 25 with the distortion along the one direction so as to have the largest value on the end surface 25A. Therefore, defining the selection wavelengths, which are the wavelengths of the light beams W2 transmitted through the light entrance areas 28A through 28E in the wavelength selection element 25, as λ1 through λ5, the selection wavelength λ1 becomes the longest of the selection wavelengths λ1 through λ5, and the selection wavelengths λ2 through λ5 descend in this order. In other words, λ1>λ2>λ3>λ4>λ5 is satisfied.

Further, the spectral line width of the light emitted from the wavelength selection element 25 is made equal to or greater than 1.0 nm by making the selection wavelengths λ1 through λ5 different from each other. Further, each of the selection wavelengths λ1 through λ5 is set to be larger than 612 nm and smaller than 658.5 nm.

The light source device 12 for emitting the green light has substantially the same configuration as that of the light source device 11, and has the spectral line width of the emitted light of equal to or greater than 1.0 nm. Further, the wavelength of the emitted light is set to be greater than 525 nm and smaller than 538 nm.

Further, the light source device 13 for emitting the blue light has substantially the same configuration as that of the light source device 11, and has the spectral line width of the emitted light of equal to or greater than 1.0 nm. Further, the wavelength of the emitted light is set to be greater than 440 nm and smaller than 468 nm.

Figure 2:
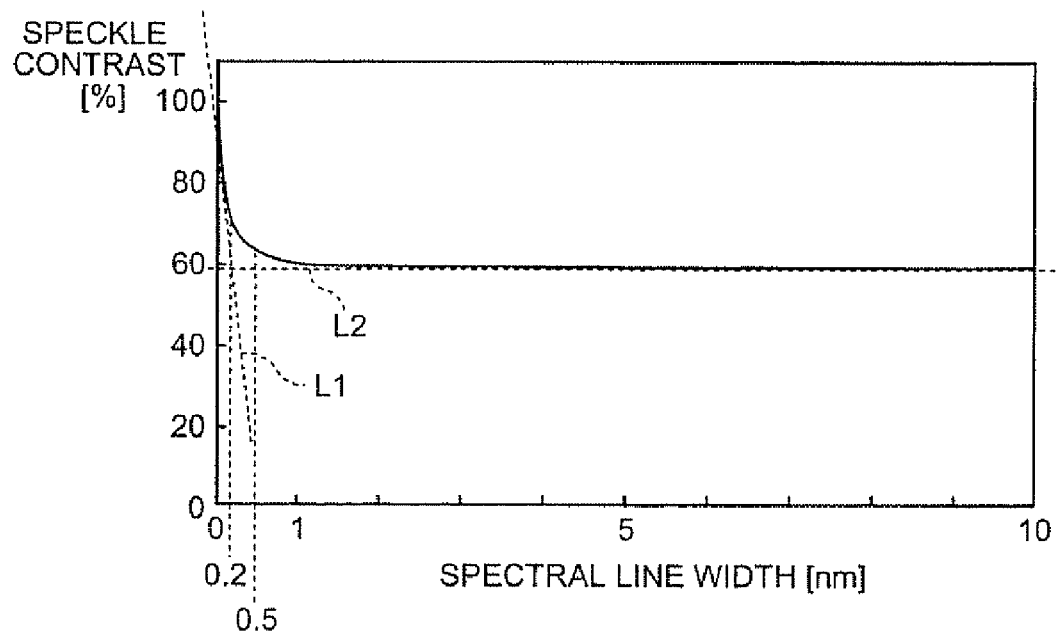
FIG. 2 is a graph showing a relationship between the spectral line width and speckle contrast.

Here, a relationship between the spectral line width and speckle contrast in each of the light source devices 11 through 13 is shown in FIG. 2. It should be noted that the characteristic curves of the speckle contrast shown in FIG. 2 become substantially the same irrespective of the wavelength of the emitted light.

As shown in FIG. 2, the speckle contrast dramatically drops as the spectral line width increases with in a range up to about 0.5 nm, and is kept substantially constant in the range in which the spectral line width exceeds about 1 nm.

Then, as shown in FIG. 2, the spectral line width is 0.2 nm at the intersection between the asymptotic line L1 of the characteristic curve of the speckle contrast in a range of the spectral line width no smaller than 0 nm and no greater than 0.1 nm and the asymptotic line L2 of the characteristic curve in a range of the spectral line width no smaller than 2.0 nm and no greater than 10 nm.

Therefore, by making the spectral line width of the light emitted from each of the light source devices 11 through 13 no smaller than 0.2 nm, the speckle contrast is sufficiently reduced, and by making the spectral line width no smaller than 1.0 nm, the speckle contrast is further reduced.

Figure 3:
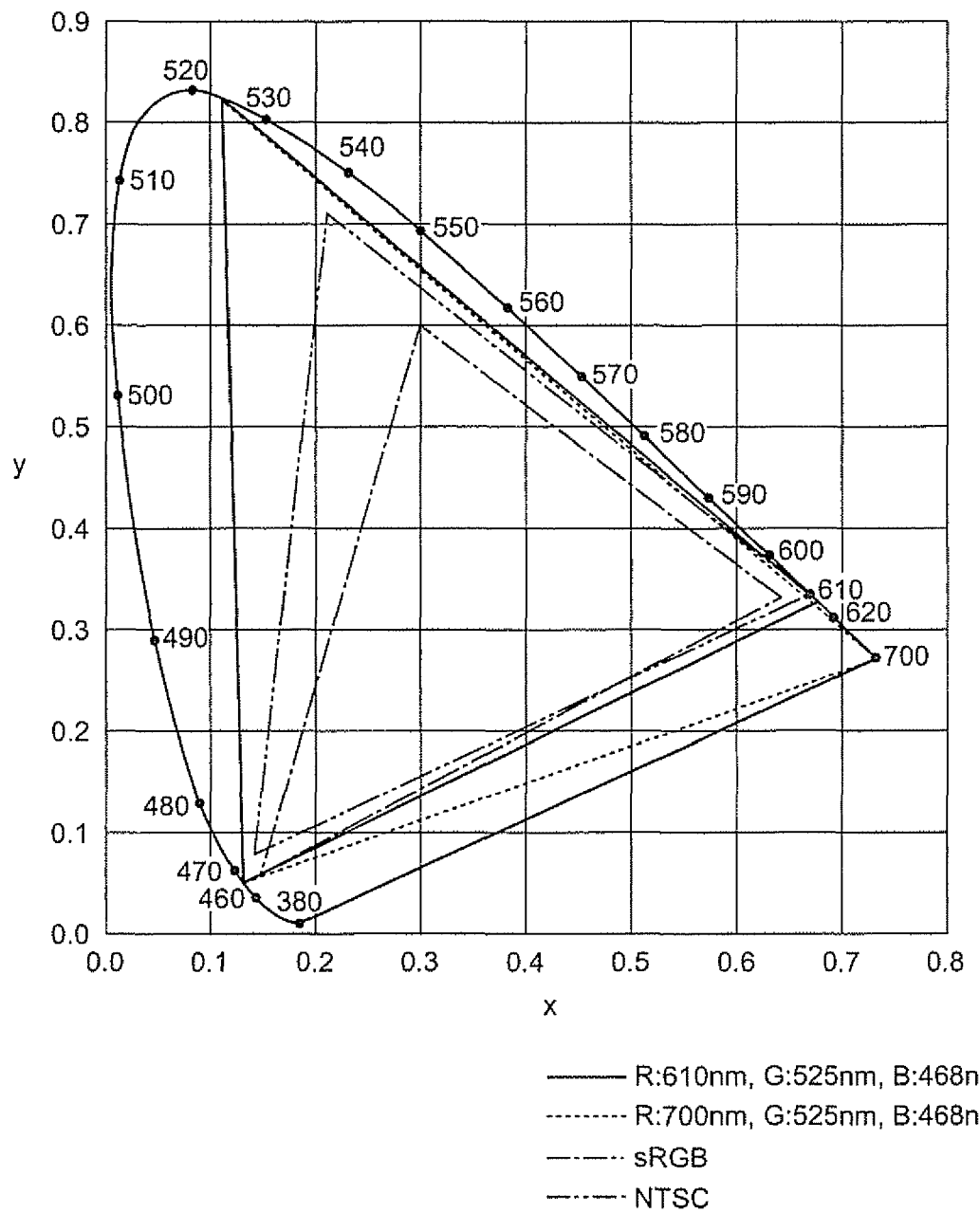
FIG. 3 is a diagram showing color gamut of each of the multi-wavelength light source device, sRGB, and NTSC.
Figure 4:
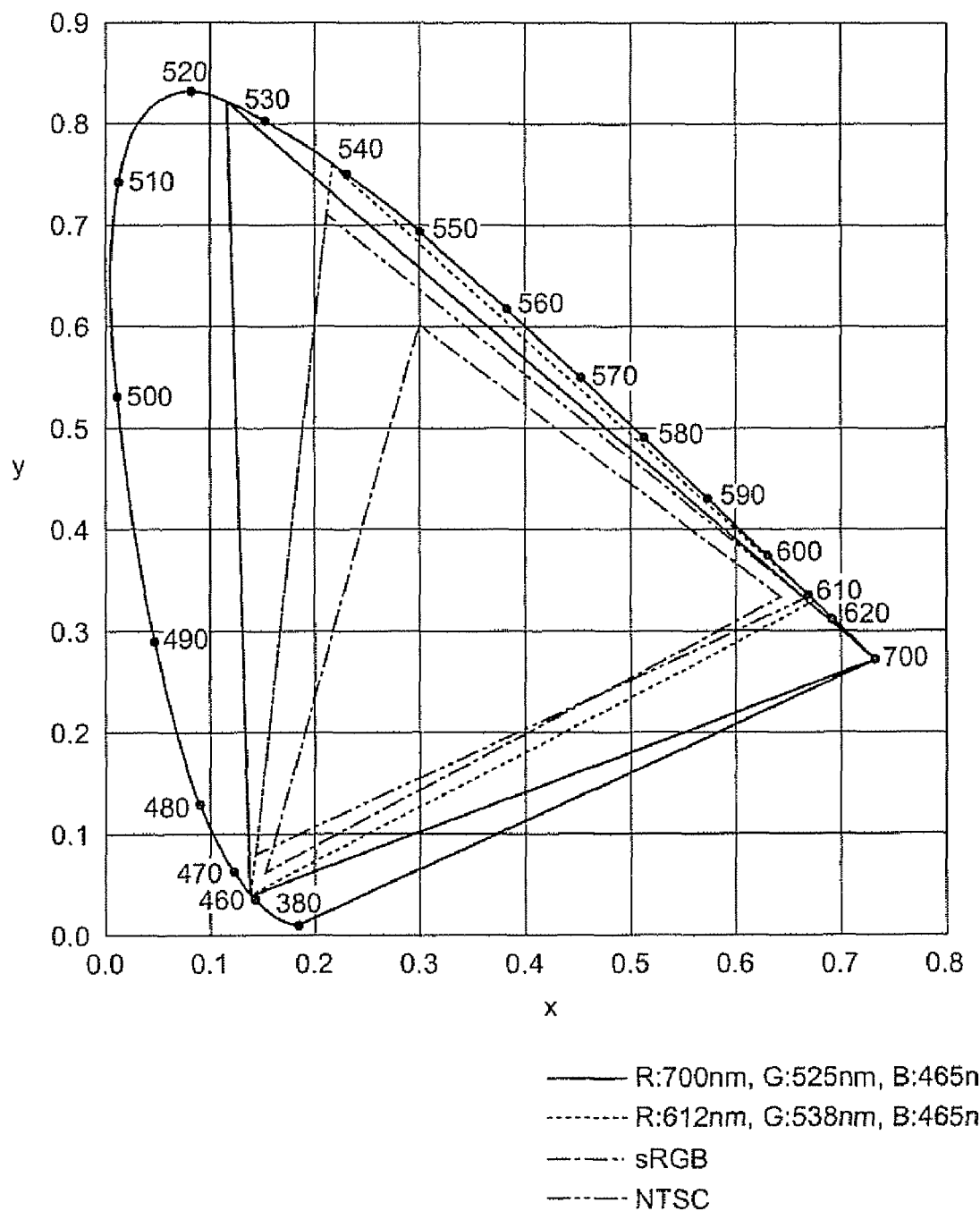
FIG. 4 is a diagram showing color gamut of each of the multi-wavelength light source device, sRGB, and NTSC.
Figure 5:
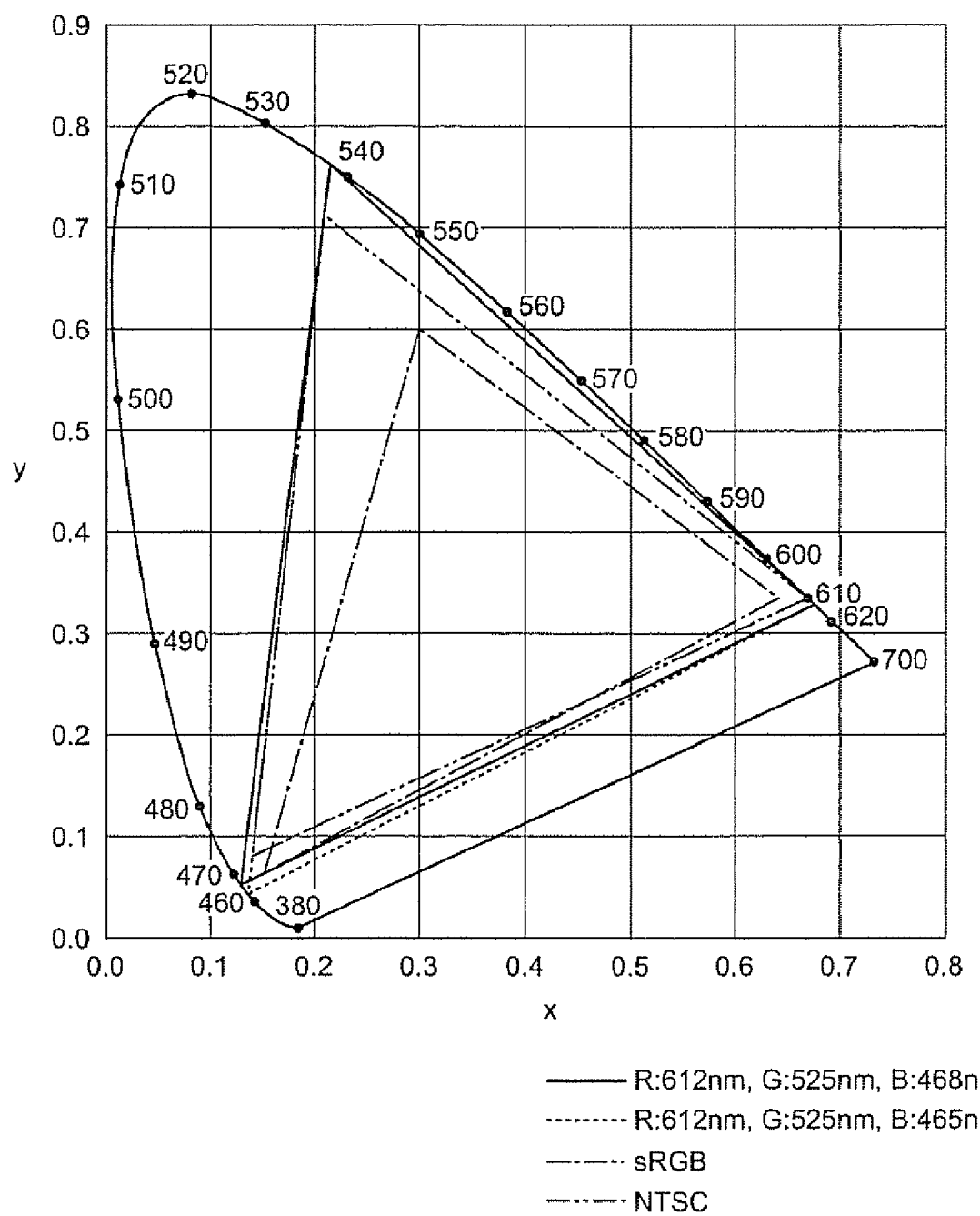
FIG. 5 is a diagram showing color gamut of each of the multi-wavelength light source device, sRGB, and NTSC.

Then, a relationship between the chromaticity diagram of the multi-wavelength light source device 1 and the chromaticity diagram of each of the sRGB and the NTSC will is shown in FIGS. 3 through 5.

FIG. 3 shows the chromaticity diagram on an assumption that the wavelengths of the laser beams emitted from the light source devices 11 through 13 are 612 nm, 525 nm, and 468 nm, respectively, and the chromaticity diagram on an assumption that the wavelengths of the laser beams emitted from the light source devices 11 through 13 are 700 nm, 525 nm, and 468 nm, respectively.

Further, FIG. 4 shows the chromaticity diagram on an assumption that the wavelengths of the laser beams emitted from the light source devices 11 through 13 are 700 nm, 538 nm, and 440 nm, respectively, and the chromaticity diagram on an assumption that the wavelengths of the laser beams emitted from the light source devices 11 through 13 are 700 nm, 525 nm, and 440 nm, respectively.

Further, FIG. 5 shows the chromaticity diagram on an assumption that the wavelengths of the laser beams emitted from the light source devices 11 through 13 are 612 nm, 538 nm, and 440 nm, respectively, and the chromaticity diagram on an assumption that the wavelengths of the laser beams emitted from the light source devices 11 through 13 are 612 nm, 538 nm, and 468 nm, respectively.

As shown in FIGS. 3 through 5, by arranging that the wavelength of the light emitted from the light source device 11 is greater than 612 nm, the wavelength of the light emitted from the light source device 12 is greater than 525 nm and smaller than 538 nm, and the wavelength of the light emitted from the light source device 13 is greater than 465 nm and smaller than 468 nm, the chromaticity diagram of the multi-wavelength light source device 1 includes the chromaticity diagrams of the sRGB and NTSC, respectively, thus the sufficient color gamut can surely be provided.

Figure 6:
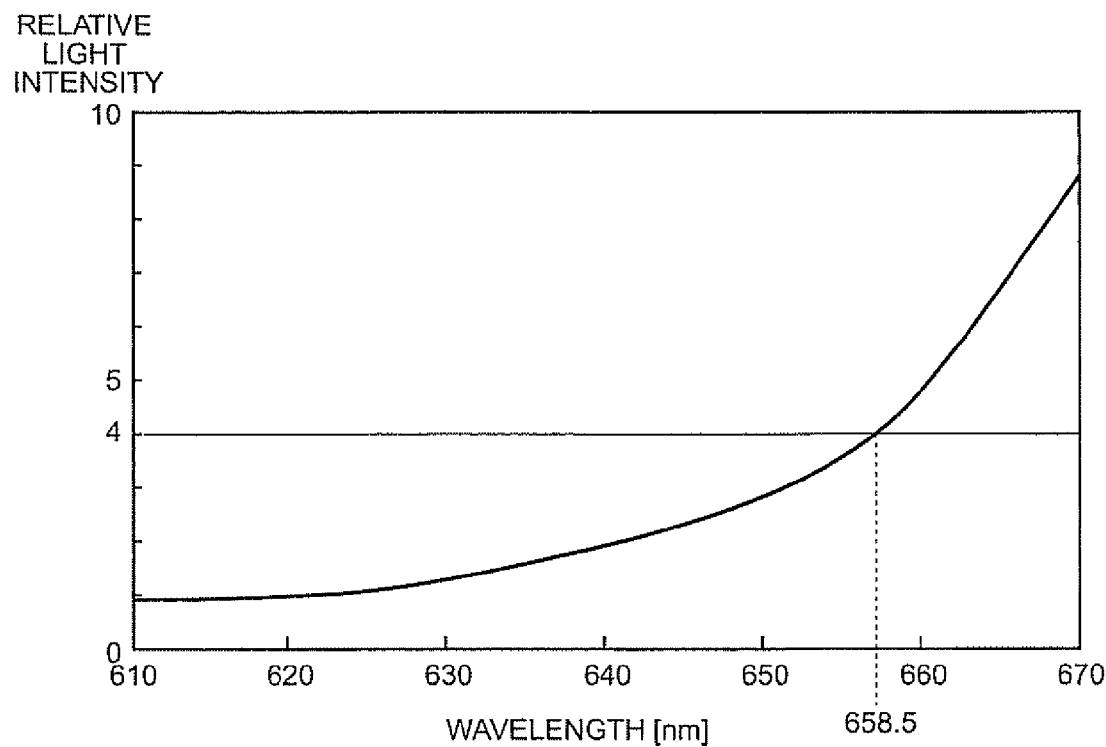
FIG. 6 is a graph showing a relationship between a wavelength and light intensity of output light in a red light source device.

Then, FIG. 6 shows a relationship between the wavelength and the intensity of the light emitted from the light source device 11. Here, there is shown the relationship between the wavelength of the emitted light and the light intensity necessary for keeping white balance with the light source devices 12, 13. It should be noted that the light intensity necessary for keeping the white balance with the light source devices 12, 13 is assumed to be 1 when the wavelength of the emitted light is set to 620 nm.

As shown in FIG. 6, the light intensity necessary for the light source device 11 increases as the wavelength of the emitted light becomes greater. Further, when the wavelength of the light emitted from the light source device 11 exceeds 658.5 nm, the relative light intensity exceeds 4. In other words, if the wavelength of the emitted light of the light source device 11 is set to be greater than 658.5 nm, the light intensity four times as strong as the light intensity necessary for the case in which the wavelength of the emitted light is set to 620 nm is required for the multi-wavelength light source device 1 in order for keeping the white balance with the light source devices 12, 13. Therefore, by making the wavelength of the light emitted from the light source device 11 smaller than 658.5 nm, keeping the white balance with the light source devices 12, 13 is prevented from becoming difficult.

As described above, according to the multi-wavelength light source device 1 of the present embodiment, the speckle noise is sufficiently reduced by making the spectral line width no smaller than 0.2 nm. Further, by making the wavelength of the light emitted from the light source device 11 greater than 612 nm and smaller than 658.5 nm, the wavelength of the light emitted from the light source device 12 greater than 525 nm and smaller than 538 nm, and the wavelength of the light emitted from the light source device 13 greater than 465 nm and smaller than 468 nm, the sufficiently wide color gamut including the color gamut of the SRGB and the color gamut of the NTSC can be obtained.

Here, by making the wavelength of the light emitted from the light source device 11 smaller than 658.5 nm, the configuration for keeping the white balance of the multi-wavelength light source device 1 can be prevented from becoming complicated.

First Modified Example of Light Source Device

Subsequently, a configuration of another light source device to which the invention can be applied will be explained with reference to the accompanying drawings. It should be noted that in the present modified example, since the configuration of the dispersing section is different from that of the embodiment described above, the explanation will be presented focusing on this point, and the constituents explained in the embodiment described above will be denoted with the same reference numerals, and the explanations therefor will be omitted. Here, FIG. 7 is a schematic configuration diagram showing the light source device.

Figure 7:
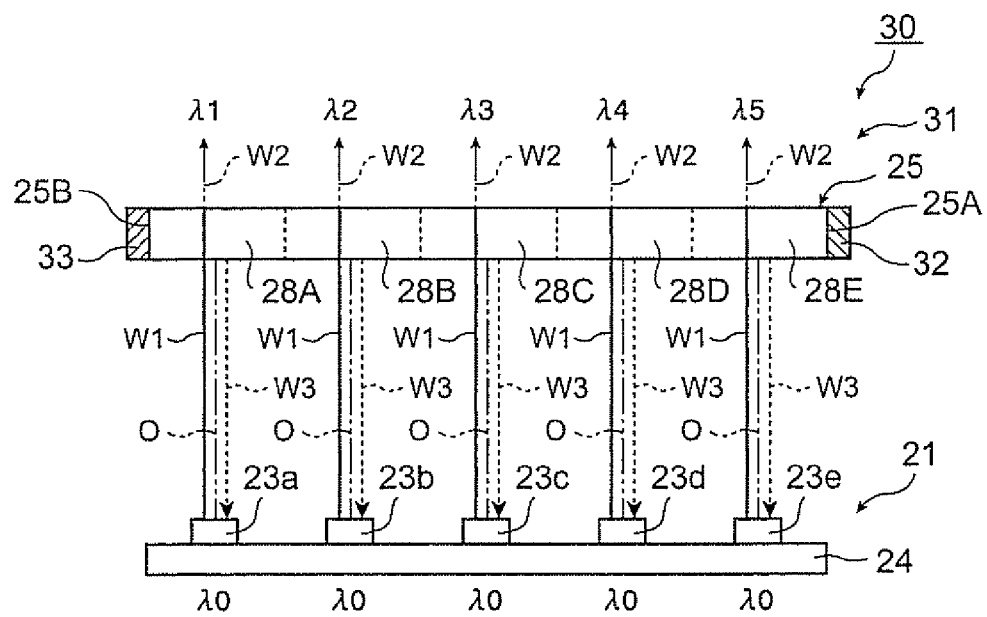
FIG. 7 is a schematic configuration diagram showing another light source device for each color according to one embodiment.

As shown in FIG. 7, in the light source device 30 in the present modified example, a dispersing section 31 is provided with Peltier elements (state changing sections) 32, 33 provided to the both end surfaces 25A, 25B of the wavelength selection element 25, respectively.

The Peltier elements 32, 33 are provided with temperatures different from each other set thereto. Therefore, the wavelength selection element 25 is heated or cooled from one of the end surfaces 25A and 25B towards the other of the end surfaces 25A and 25B and vice versa. Further, the expansion caused by heating or shrinkage cause by cooling is provided to the wavelength selection element 25, thus providing the refractive index distribution to the wavelength selection element 25. It should be noted that since the intervals of the periodic structure increase by the thermal expansion, the wavelength of the light transmitted through the wavelength selection element 25 is shifted to the greater wavelength side as the temperature rises.

On this occasion, the temperature of the wavelength selection element 25 is the highest at the light entrance area 28A, and gradually decreases in the light entrance areas 28B through 28E in this order. Thus, the wavelength selection element 25 is provided with the refractive index distribution. Further, the selection wavelengths $\lambda 1$ through $\lambda 5$ descend in this order.

The light source device 30 with such a configuration also has substantially the same function and brings substantially the same advantage as described above. It should be noted that it is sufficient to provide at least one of the Peltier elements 32, 33 to either one or both of the end surfaces 25A, 25B. Further, other heating members such as electrically-heated wires can be used instead of the Peltier elements 32, 33 providing the heating members are capable of providing the wavelength selection element 25 with the temperature distribution.

Second Modified Example of Light Source Device

Subsequently, a configuration of another light source device to which the invention can be applied will be explained with reference to the accompanying drawings. It should be noted that in the present modified example, since the configuration of the dispersing section is different from that of the embodiment described above, the explanation will be presented focusing on this point, and the constituents explained in the embodiment described above will be denoted with the same reference numerals, and the explanations therefor will be omitted. Here, FIG. 8 is a schematic configuration diagram showing the light source device.

Figure 8:
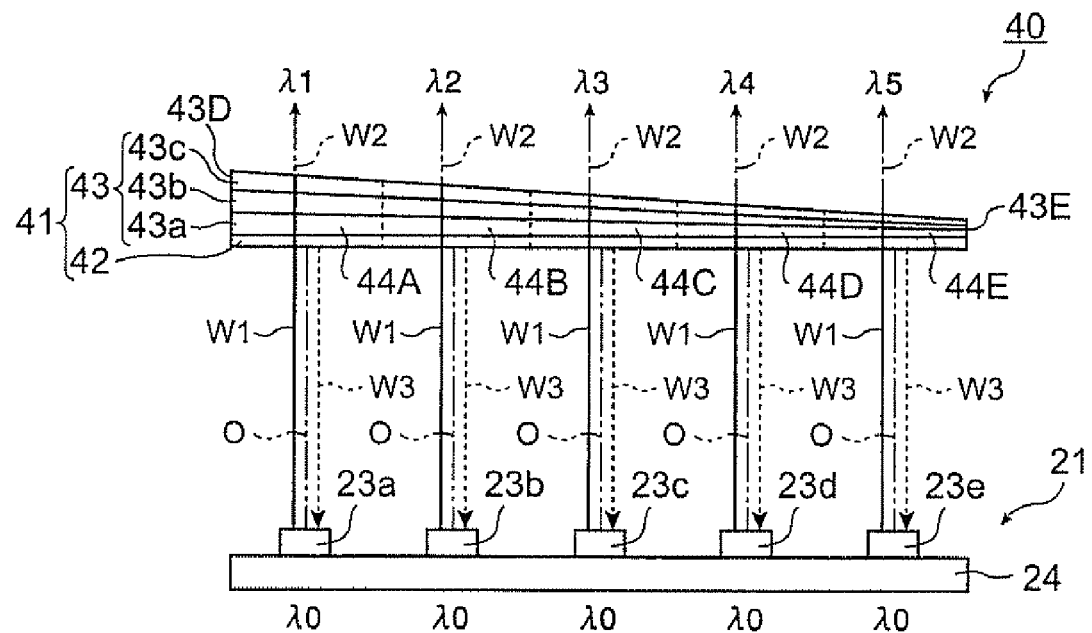
FIG. 8 is a schematic configuration diagram also showing another light source device according to one embodiment.

As shown in FIG. 8, the light source device 40 according to the present modified example is provided with the wavelength selection element (the dispersing section) 41.

The wavelength selection element 41 is provided with a substrate 42 made of a translucent material such as glass, and a wavelength selection film 43 stacked on the substrate 42.

The wavelength selection film 43 has a configuration of stacking a first through third selection films 43a through 43c sequentially from the substrate 42 side. The first and third selection films 43a, 43c are each made, for example, of $SiO_2$, and the second selection film 43b is made, for example, $TiO_2$. Further, each of the first through third selection films 43a through 43c is formed using, for example, an oblique evaporation method, thus the thickness thereof decreases from one end surface 43D towards the other end surface 43E in one direction along which the light emitting elements 23a through 23e are arranged. It should be noted that the wavelength of the light transmitted through the wavelength selection element 41 varies to be greater as the film thickness of the wavelength selection film 43 increases.

On this occasion, the film thickness of the wavelength selection film 43 is the greatest at the light entrance area 44A, and gradually decreases in the light entrance areas 44B through 44E in this order. Thus, the selection wavelengths $\lambda 1$ through $\lambda 5$ descend in this order.

The light source device 40 with such a configuration also has substantially the same function and brings substantially the same advantage as described above. It should be noted that the number of the selection films to be stacked and the material used for forming the selection films can appropriately be changed in accordance with the selection wavelengths.

Third Modified Example of Light Source Device

Subsequently, a configuration of another light source device to which the invention can be applied will be explained with reference to the accompanying drawings. It should be noted that in the present modified example, since the configuration of the dispersing section is different from that of the embodiment described above, the explanation will be presented focusing on this point, and the constituents explained in the embodiment described above will be denoted with the same reference numerals, and the explanations therefor will be omitted. Here, FIG. 9 is a schematic configuration diagram showing the light source device.

Figure 9:
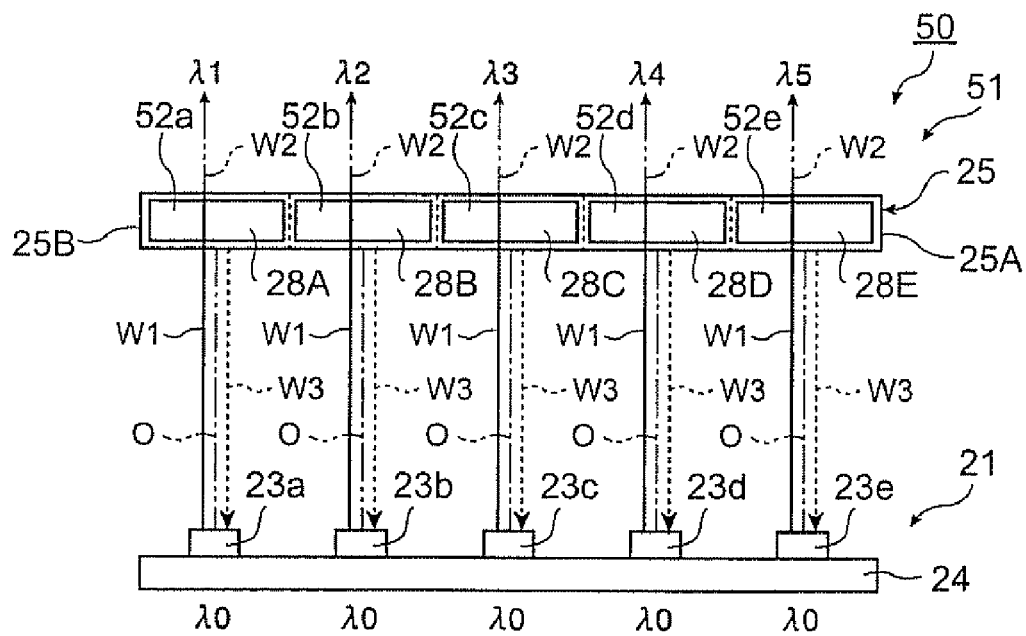
FIG. 9 is a schematic configuration diagram also showing another light source device according to one embodiment.

As shown in FIG. 9, the light source device 50 according to the present modified example has the dispersing section 51 provided with a plurality of piezoelectric elements 52a through 52e disposed in the respective light entrance areas 28A through 28E in the wavelength selection element 25 with distances between the adjacent piezoelectric elements. Here, it is possible that the wavelength selection element 25 has a configuration of disposing a vibration isolating member on each of the boundaries between the light entrance areas 28A through 28E, thereby preventing the distortion caused in the light entrance areas 28A through 28E from being transferred to the adjacent light entrance areas 28A through 28E.

The piezoelectric elements 52a through 52e provide the respective light entrance areas 28A through 28E with the distortions having magnitudes different from each other. The magnitudes of the distortions provided to the light entrance areas 28A through 28E descend in the order, for example, of the light entrance areas 285E 28C, 28E, 28D, and 28A. Therefore, the selection wavelengths $\lambda 1$ through $\lambda 5$ descend in the order of $\lambda 1$, $\lambda 4$, $\lambda 5$, $\lambda 3$, and $\lambda 2$. In other words, $\lambda 1 > \lambda 4 > \lambda 5 > \lambda 3 > \lambda 2$ is satisfied.

The light source device 50 with such a configuration also has substantially the same function and brings substantially the same advantage as described above, and in addition, since it is possible to discontinuously (randomly) determine the selection wavelengths $\lambda 1$ through $\lambda 5$ in the light entrance areas 28A through 28E, respectively, the freedom of determining the selection wavelengths $\lambda 1$ through $\lambda 5$ can be enhanced. Further, since the selection wavelengths $\lambda 1$ through $\lambda 5$ in the adjacent two of the light entrance areas 28A through 28E can be made significantly different from each other, the speckle noise can more efficiently be reduced.

It should be noted that the configurations similar to the configuration in the present modified example, in which the light entrance areas 28A through 28E are respectively provided with the piezoelectric elements 52a through 52e, can be applied to the first and second modified examples described above. Specifically, in the first modified example described above, it is possible to respectively provide the light entrance areas 28A through 28E with the Peltier elements, thereby executing temperature control individually on the light entrance areas 28A through 28E. Further, in the second modified example described above, it is possible to vary the thickness of the wavelength selection film discretely (randomly) between the light entrance areas 44A through 44E.

Fourth Modified Example of Light Source Device

Subsequently, a configuration of another light source device to which the invention can be applied will be explained with reference to the accompanying drawings. It should be noted that in the present modified example, since the configuration of the dispersing section is different from that of the embodiment described above, the explanation will be presented focusing on this point, and the constituents explained in the embodiment described above will be denoted with the same reference numerals, and the explanations therefor will be omitted. Here, FIG. 10 is a schematic configuration diagram showing the light source device.

Figure 10:
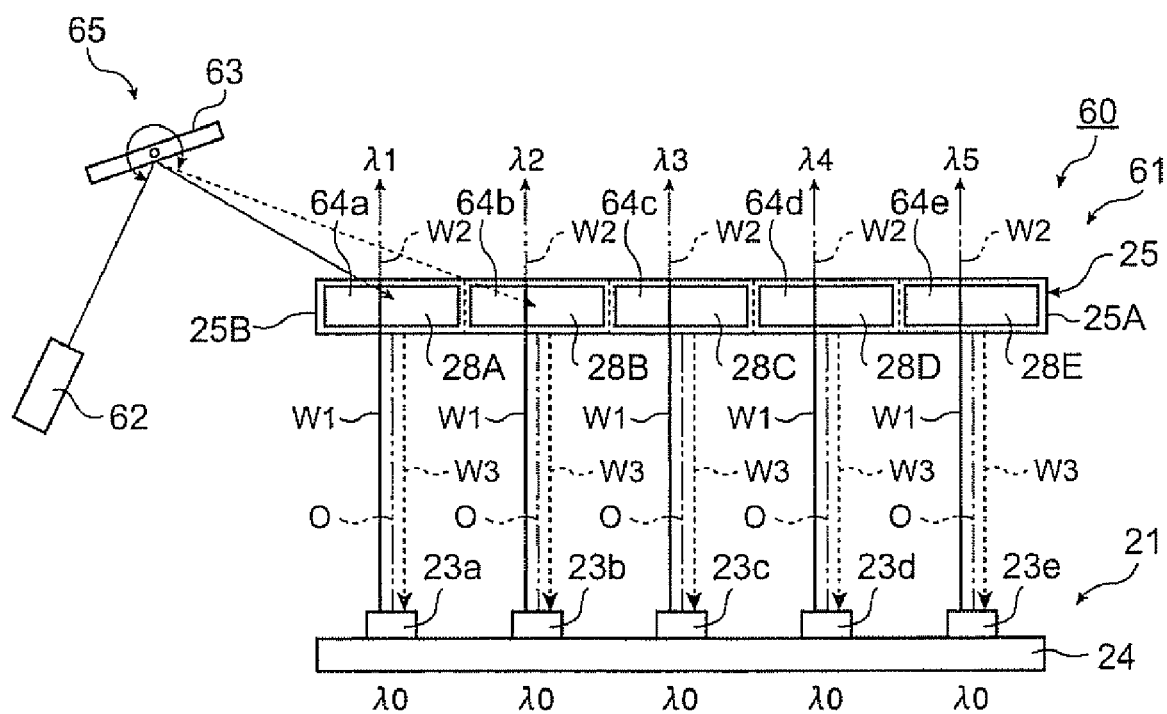
FIG. 10 is a schematic configuration diagram also showing another light source device according to one embodiment.

As shown in FIG. 10, the light source device 60 according to the present modified example has a dispersing section 61 including a heating section (a state changing section) 65 provided with a heat generating laser source 62, a mirror 63, and absorption films 64a through 64e. Here, it is possible that the wavelength selection element 25 has a configuration of disposing a heat insulating member on each of the boundaries between the light entrance areas 28A through 28E, thereby preventing the heat caused in the light entrance areas 28A through 28E from being transferred to the adjacent light entrance areas 28A through 28E.

The heat generating laser source 62 has a configuration of emitting a laser beam to each of the absorption films 64a through 64e via the mirror 63.

The mirror 63 is arranged to be changed in the tilt of the reflecting surface, and has a configuration of scanning the laser beam emitted from the heat generating laser source 62 towards the absorption films 64a through 64e.

The absorption films 64a through 64e are attached respectively to the light entrance areas 28A through 28E in the wavelength selection element 25 with intervals therebetween, and absorb the laser beam emitted thereon, thereby heating the light entrance areas 28A through 28S, respectively.

The hearing section 65 appropriately determines the material and the film thicknesses of the absorption films 64a through 64e, and the period of time during which the laser beam is applied, thereby heating the light entrance areas 28A through 28E to the temperatures different from each other. The heating temperatures of the light entrance areas 28A through 28E ascend in the order, for example, of the light entrance areas 28B, 28C, 28E, 28D, and 28A. Therefore, the selection wavelengths λ1 through λ5 descend in the order of λ1, λ4, λ5, λ3, and λ2. In other words, λ1>λ4>λ5>λ3>λ2 is satisfied.

The light source device 60 with such a configuration also has substantially the same function and brings substantially the same advantage as described above.

Fifth Modified Example of Light Source Device

Subsequently, a configuration of another light source device to which the invention can be applied will be explained with reference to the accompanying drawings. It should be noted that in the present modified example, since the configuration of the dispersing section is different from that of the embodiment described above, the explanation will be presented focusing on this point, and the constituents explained in the embodiment described above will be denoted with the same reference numerals, and the explanations therefor will be omitted. Here, FIG. 11 is a schematic configuration diagram showing the light source device.

Figure 11:
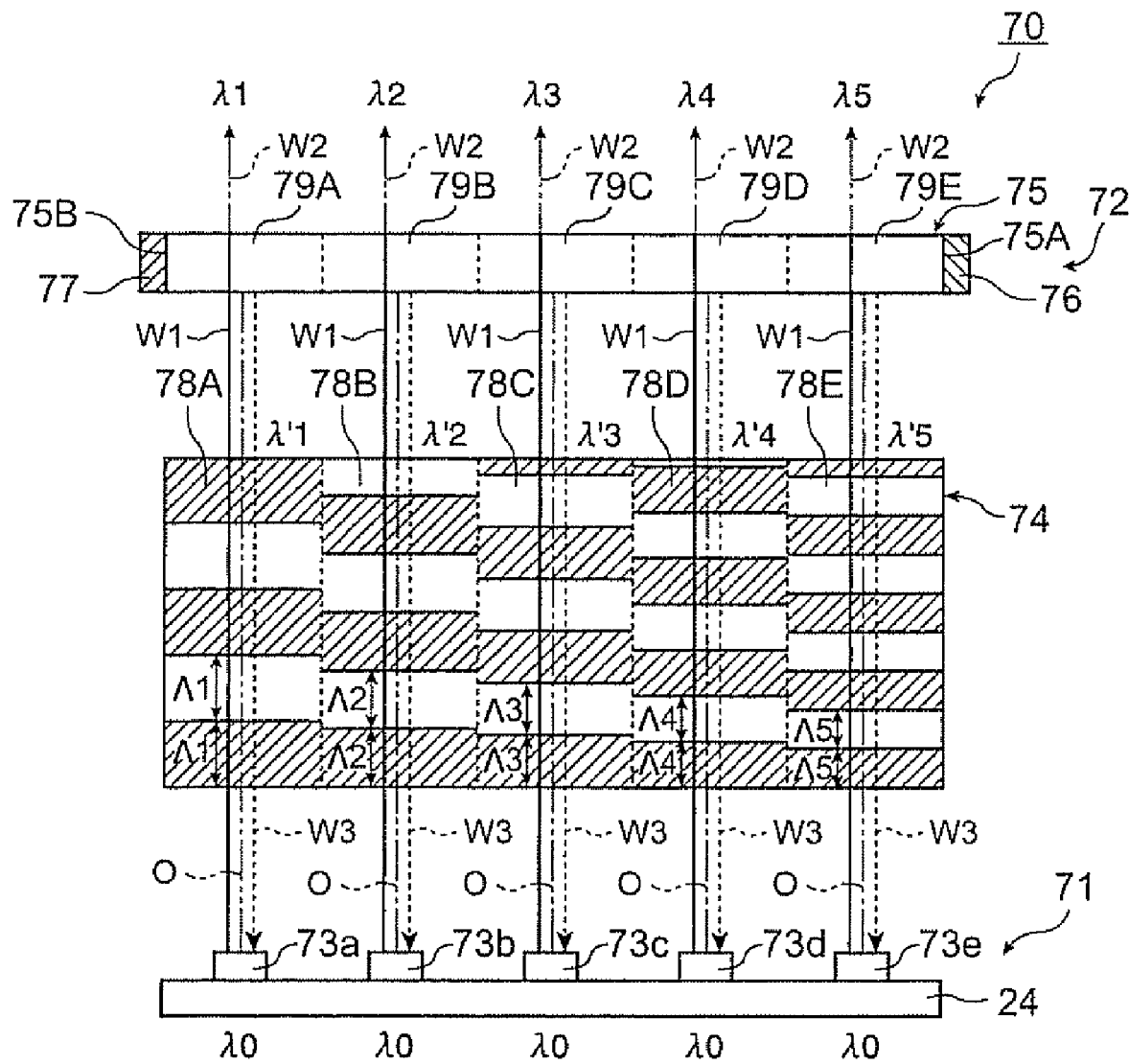
FIG. 11 is a schematic configuration diagram also showing another light source device according to one embodiment.

As shown in FIG. 11, the light source device 70 according to the present modified example is provided with the a light emitting section 71 and the dispersing section 72.

The light emitting section 71 is provided with light emitting elements 73a through 73e, and the support member 24. The light emitting elements 73a through 73e are each formed of, for example, a VECSEL, and each emit a laser beam with a wavelength of, for example, λ0.

The dispersing section 72 is provided with a wavelength conversion element 74, a wavelength selection element 75, a piezoelectric element 76, and an absorption member 77.

The wavelength conversion element 74 is a nonlinear optical element for converting the laser beams emitted from the light emitting elements 73a through 73e into second harmonic waves thereof each having a wavelength roughly half that of the original laser beam. Further, the wavelength conversion element 74 is made, for example, of $KNbO_3$ (potassium niobate), a kind of nonlinear crystal, and formed to have a plate-like shape. Here, the stronger the intensity of the incident light to the wavelength conversion element 74 is, the higher the wavelength conversion efficiency by the wavelength conversion element 74 becomes, and the wavelength conversion efficiency by the wavelength conversion element 74 is in a range of about 40% through 50%.

Further, the wavelength conversion element 74 is provided with light entrance areas 78A through 78E where the light beams emitted from the light emitting elements 73a through 73e enter, respectively. In other wards, the light beam emitted from the light emitting element 73a enters the light entrance area 78A, the light beam emitted from the light emitting element 73b enters the light entrance area 78B, the light beam emitted from the light emitting element 73c enters the light entrance area 78C, the light beam emitted from the light emitting element 73d enters the light entrance area 78D, and the light beam emitted from the light emitting element 73e enters the light entrance area 78E.

Since the light emitting elements 73a through 73e correspondingly respectively to the light entrance areas 78A through 78E are linearly arranged in one direction perpendicular to the optical axis O, the light entrance areas 78A through 78E are similarly arranged along the one direction.

Further, the wavelength conversion element 74 is provided with periodic polarization structures, each of which is a repeated structure of domains with polarization reversed to each other. When the incident light is transmitted through each of the periodic polarization structures, the wavelength of the incident light is converted. The pitches, which are the widths of the periodic polarization structures in the direction of the optical axis O in the respective light entrance areas 78A through 78E, are defined as Λ1 through Λ5. Here, in the pitches Λ1 through Λ5, Λ1 is the largest, and Λ2 through Λ5 descend in this order. In other words, Λ1>Λ2>Λ3>Λ4>Λ5 is satisfied. Therefore, defining the conversion wavelengths, which are the wavelengths of the light beams emitted respectively from the light entrance areas 78A through 78E in the wavelength conversion element 74, as λ'1 through λ'5, the conversion wavelength λ'1 becomes the longest of the conversion wavelengths λ'1 through λ'5, and the conversion wavelengths λ'2 through λ'5 descend in this order. In other words, λ'1>λ'2>λ'3>λ'4>λ'5 is satisfied.

The wavelength selection element 75 transmits the light beams converted by the wavelength conversion element 74 to have the conversion wavelengths λ'1 through λ'5, and reflects the light beams which have not been converted, thus functioning as resonator mirrors in cooperation with the light emitting elements 73a through 73e.

Further, the piezoelectric element 76 provides the wavelength selection element 75 with the distortion along the one direction so as to have the largest value on the end surface 25A. Therefore, defining the wavelengths of the light beams emitted respectively from the light entrance areas 79A through 79E in the wavelength selection element 75, as λ1 through λ5, the wavelength λ1 becomes the longest of the wavelengths λ1 through λ5, and the wavelengths λ2 through λ5 descend in this order. In other words, λ'1>λ2>λ3>λ4>λ5 is satisfied.

The light source device 70 with such a configuration also has substantially the same function and brings substantially the same advantage as described above.

It should be noted that although in the present modified example, the pitches Λ1 through Λ5 in the respective light entrance areas 78A through 78E forming the wavelength conversion element 74 descend in the order of Λ1 through Λ5, a discontinuous (random) order can also be adopted. On this occasion, the selection wavelengths λ1 through λ5 in the light entrance areas 79A through 79E forming the wavelength selection element 75 are determined so as to correspond to the conversion wavelengths λ'1 through λ'5 converted in the wavelength conversion element 74.

Sixth Modified Example of Light Source Device

Subsequently, a configuration of another light source device to which the invention can be applied will be explained with reference to the accompanying drawings. It should be noted that in the present modified example, since the configuration of the dispersing section is different from that of the fifth modified example described above, the explanation will be presented focusing on this point, and the constituents explained in the embodiment and the fifth modified example described above will be denoted with the same reference numerals, and the explanations therefor will be omitted. Here, FIG. 12 is a schematic configuration diagram showing the light source device.

Figure 12:
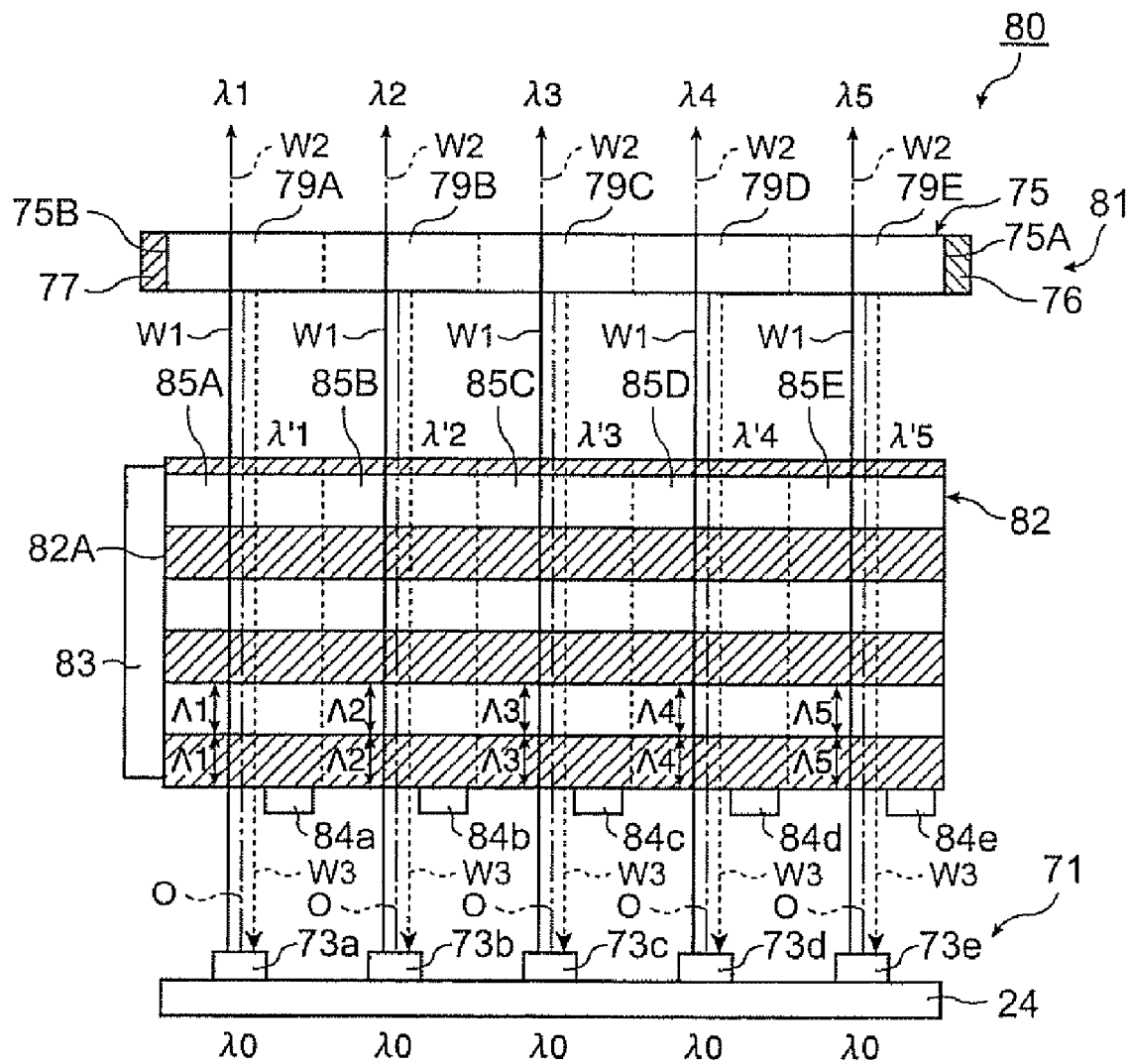
FIG. 12 is a schematic configuration diagram also showing another light source device according to one embodiment.

As shown in FIG. 12, in the light source device 80 according to the present modified example, a dispersing section 81 is provided with a wavelength conversion element 82, a Peltier element (the state changing section) 83, and temperature sensors 84a through 84e.

The pitches Λ1 through Λ5 of the periodic polarization structures provided to the wavelength conversion element 82 are arranged to be substantially the same in the condition in which the control by the Peltier element 83 is not executed.

The Peltier element 83 is disposed on one end surface 82A of the wavelength conversion element 82, and heats or cools the light entrance areas 85A through 85E at respective temperatures different from each other. Further, the Peltier element 83 is controlled based on the respective detection results of the temperature sensors 84a through 84e. The temperature sensors 84a through 84e are disposed on the entrance end surfaces (the end surfaces facing the plurality of light emitting elements 73a through 73e) in the light entrance areas 85A through 85E, and detect the temperatures in the light entrance areas 85A through 85E, respectively.

Therefore, when the wavelength conversion element 82 is heated or cooled on the end surface 82A by the Peltier element 83, a temperature gradient along one direction is formed in the wavelength conversion element 82. On this occasion, the temperature of the wavelength conversion element 82 is the highest on the end surface 82A, and decreases as the point at which the temperature is detected moves in one direction increasing the distance from the end surface 82A. Further, the wavelength conversion element 82 is provided with a refractive index gradient based on the temperature gradient.

Since the temperature gradient and the refractive index gradient are thus provided to the wavelength conversion element 82, the pitches Λ1 through Λ5 are varied individually. In the pitches Λ1 through Λ5 thus varied, Λ1 is the largest, and Λ2 through descend in this order.

Therefore, in the wavelength conversion element 82, the wavelength λ'1 is the longest of the conversion wavelengths λ'1 through λ'5 in the respective light entrance areas 85A through 85E, and the conversion wavelengths λ'2 through λ'5 descend in this order.

The light source device 80 with such a configuration also has substantially the same function and brings substantially the same advantage as described above. In addition, since the pitches Λ1 through Λ5 are arranged to be substantially equal to each other in the condition in which the temperature control by the Peltier element 83 is not executed, manufacturing of the wavelength conversion element 82 becomes easy. It should be noted that the temperature sensors 84a through 84e can be eliminated in the case in which the temperatures in the light entrance areas 85A through 85E of the wavelength conversion element 82 can be controlled by the Peltier element 83.

Seventh Modified Example of Light Source Device

Subsequently, a configuration of another light source device to which the invention can be applied will be explained with reference to the accompanying drawings. It should be noted that in the present modified example, since the configuration of the dispersing section is different from that of the sixth modified example described above, the explanation will be presented focusing on this point, and the constituents explained in the embodiment and the sixth modified example described above will be denoted with the same reference numerals, and the explanations therefor will be omitted. Here, FIG. 13 is a schematic configuration diagram showing the light source device.

Figure 13:
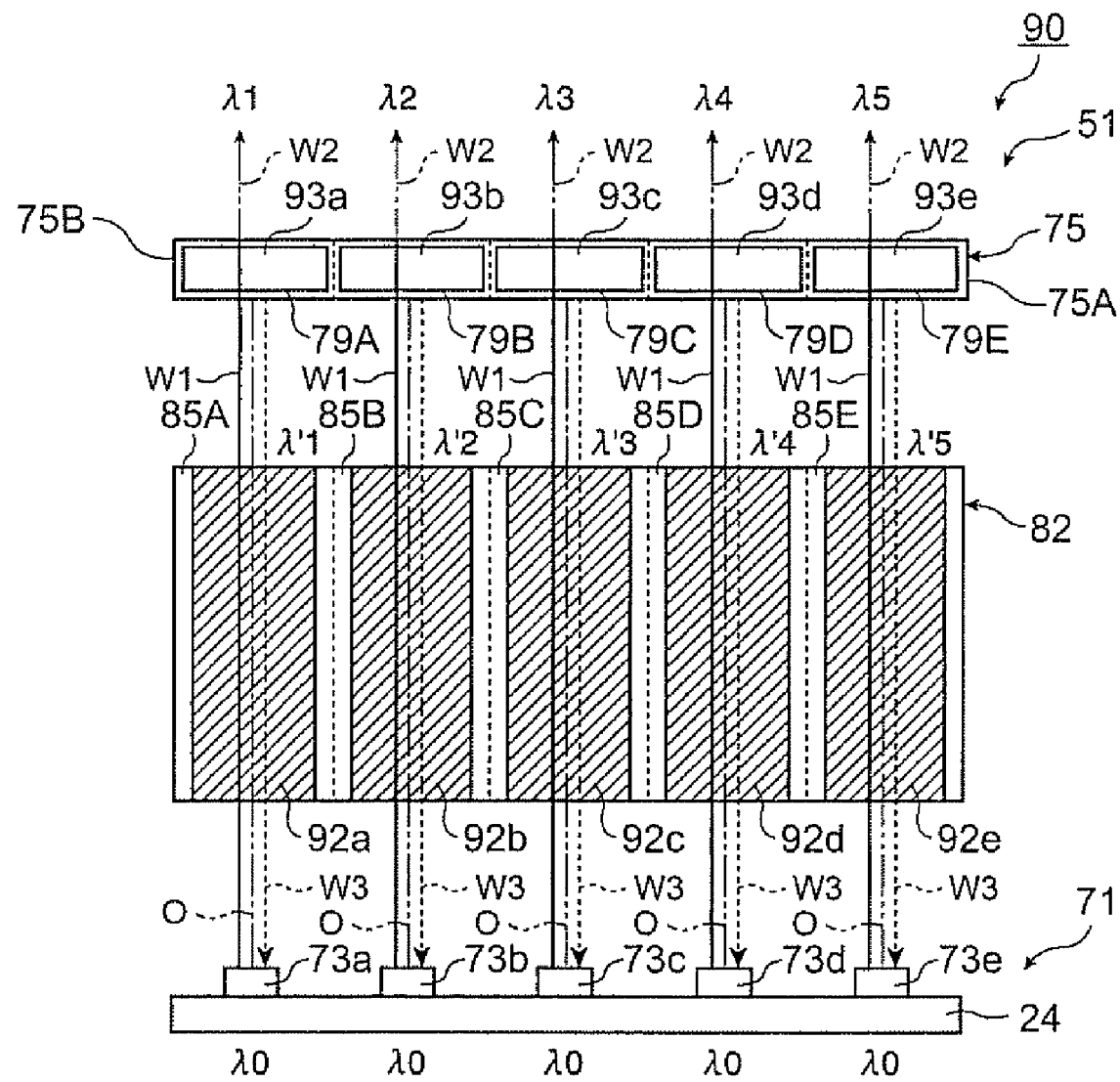
FIG. 13 is a schematic configuration diagram also showing another light source device according to one embodiment.

As shown in FIG. 13, in the light source device 90 according to the present modified example, a dispersing section 91 is provided with a plurality of Peltier elements 92a through 92e, and a plurality of piezoelectric elements 93a through 93e.

The plurality of Peltier elements 92a through 92e are respectively provided to the light entrance areas 85A through 85E in the wavelength conversion element 82 with distances between the adjacent Peltier elements. Here, it is possible that the wavelength conversion element 82 has a configuration of disposing a heat insulating member on each of the boundaries between the light entrance areas 85A through 85E, thereby preventing the heat caused in the light entrance areas 85A through 85E from being transferred to the adjacent light entrance areas 85A through 85E.

The Peltier elements 92a through 92e execute heating or cooling on the light entrance areas 85A through 85E at respective temperatures different from each other. The temperatures of the light entrance areas 85A through 85E ascend in the order, for example, of the light entrance areas 85B, 85C, 85E, 85D, and 85A. Therefore, the conversion wavelengths λ'1 through λ'5 descend in the order of λ'1, λ'4, λ'5, λ'3, and λ'2. In other words, λ'1>λ'4>λ'5>λ'3>λ'2 is satisfied.

The plurality of piezoelectric elements 93a through 93e are respectively provided to the light entrance areas 79A through 79E in the wavelength selection element 75 with distances between the adjacent piezoelectric elements. Here, it is possible that the wavelength selection element 75 has a configuration of disposing a vibration isolating member on each of the boundaries between the light entrance areas 79A through 79E, thereby preventing the distortion caused in the light entrance areas 79A through 79E from being transferred to the adjacent light entrance areas 79A through 79E.

The light source device 90 with such a configuration also has substantially the same function and brings substantially the same advantage as described above, and in addition, since it is possible to discontinuously (randomly) determine the conversion wavelengths λ'1 through λ'5 in the light entrance areas 85A through 85E, respectively, the freedom of determining the conversion wavelengths λ'1 through λ'5 can be enhanced. Further, since the conversion wavelengths λ'1 through λ'5 in the adjacent two of the light entrance areas 85A through 85E can be made significantly different from each other, the speckle noise can more efficiently be reduced.

It should be noted that although in the present modified example, it is arranged that the temperatures in the light entrance areas 85A through 85E can independently be determined by providing the light entrance areas 85A through 85E respectively with the Peltier elements 92a through 92e, it is possible to arrange that the temperature can be set using other measures such as electrically-heated wires or irradiation with the heating laser beam.

Projector

Figure 14:
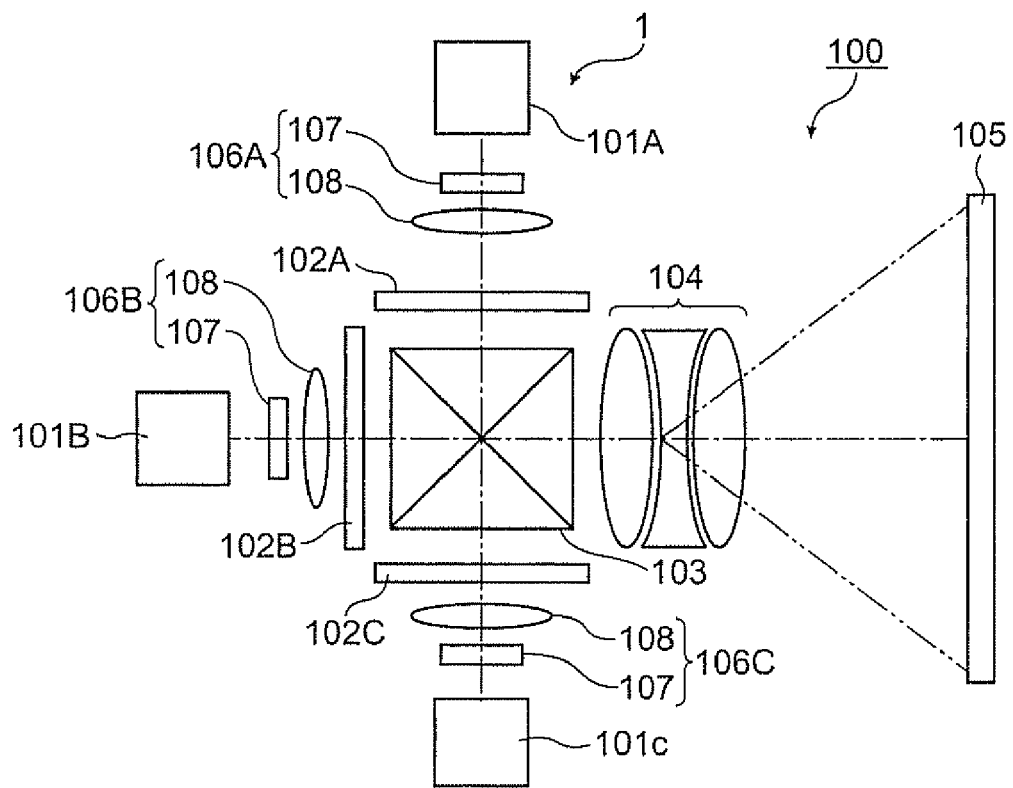
FIG. 14 is a schematic configuration diagram showing a projector equipped with the multi-wavelength light source device.

The multi-wavelength light source device 1 with the configuration described above is used for the projector 100 (an image display device) as shown in FIG. 14. Here, FIG. 14 is a schematic configuration diagram showing the projector.

As shown in FIG. 14, the projector 100 is provided with the multi-wavelength light source device 1, light valves 102A through 102C for respectively modulating light beams emitted from a red light source device, a green light source device, and a blue light source device (light source devices) 101A through 101C forming the multi-wavelength light source device 1, a dichroic prism 103, and a projection optical system 104. Further, color image light emitted from the projector 100 is projected on a screen 105.

As each of the red, green, and blue light source devices 101A through 101C, either one of the light source devices 11 through 13, 30, 40, 50, 60, 70, 80, and 90 described above is used. It should be noted that it is not necessary that all of the red, green, and blue light source devices 101A through 101C have the same configurations, and it is possible to use any of the light source devices 11 through 13, 30, 40, 50, 60, 70, 80, and 90 in combination.

The light valves 102A through 102C are each formed, for example, of a liquid crystal device, and have configurations of modulating the laser beams emitted respectively from the red, green, and blue light source devices 101A through 101C in accordance with an image signal supplied thereto.

Further, on the light paths between the red, green, and blue light source devices 101A through 101C and the light valves 102A through 102C, there are disposed equalizing optical systems 106A through 106C for equally irradiating the corresponding light valves 102A through 102C with the light beams emitted from the red, green, and blue light source devices 101A through 101C, respectively. Each of the equalizing optical systems 106A through 106C is provided with, for example, a hologram 107 and a field lens 108.

The dichroic prism 103 is composed of four rectangular prisms bonded to each other, and on the boundaries therebetween, there are formed a dielectric multilayer film for reflecting the red light and a dielectric multilayer film for reflecting the blue light to have an X shape. The three colored light beams are combined by these dielectric multilayer films to form a light beam for representing a color image.

The projection optical system 104 has a configuration of enlargedly projecting the color image thus combined by the dichroic prism 103 on the screen 105.

Here, since the wavelength of the light emitted from the blue light source device 101C is set to be greater than 440 nm, the endurance of the light valve 102C can be maintained.

Scanning Image Display Device

Figure 15:
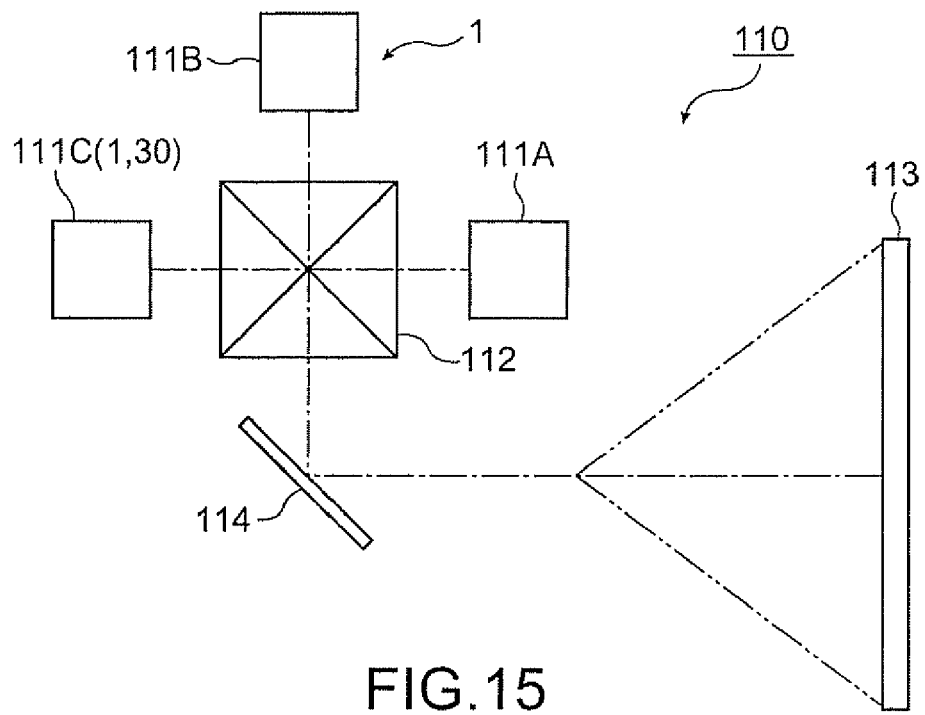
FIG. 15 is a schematic configuration diagram showing a scanning image display device equipped with the multi-wavelength light source device.

Further, the multi-wavelength light source device 1 is also used for a scanning image display device (the image display device) 110 as shown in FIG. 15. Here, FIG. 15 is a schematic configuration diagram showing the scanning image display device.

As shown in FIG. 15, the scanning image display device 110 is provided with red, green, and blue light source devices 111A through 111C, a dichroic prism 112, and a micro electro-mechanical systems (MEMS) mirror 114 for scanning the light beams emitted from the red, green, and blue light source devices 111A through 111C towards the screen 113.

As each of the red, green, and blue light source devices 111A through 111C, either one of the light source devices 11 through 13, 30, 40, 50, 60, 70, 80, and 90 described above is used. It should be noted that it is not necessary that all of the red, green, and blue light source devices 111A through 111C have the same configurations, and it is possible to use any of the light source devices 11 through 13, 30, 40, 50, 60, 70, 80, and 90 in combination.

In this image display device 110, the light beams emitted from the red, green, and blue light source devices 111A through 111C are led so as to scan the screen 113 in both of the horizontal and vertical directions in accordance with driving of the MEMS mirror 114, thus displaying the image on the screen 113.

Monitor Device

Figure 16:
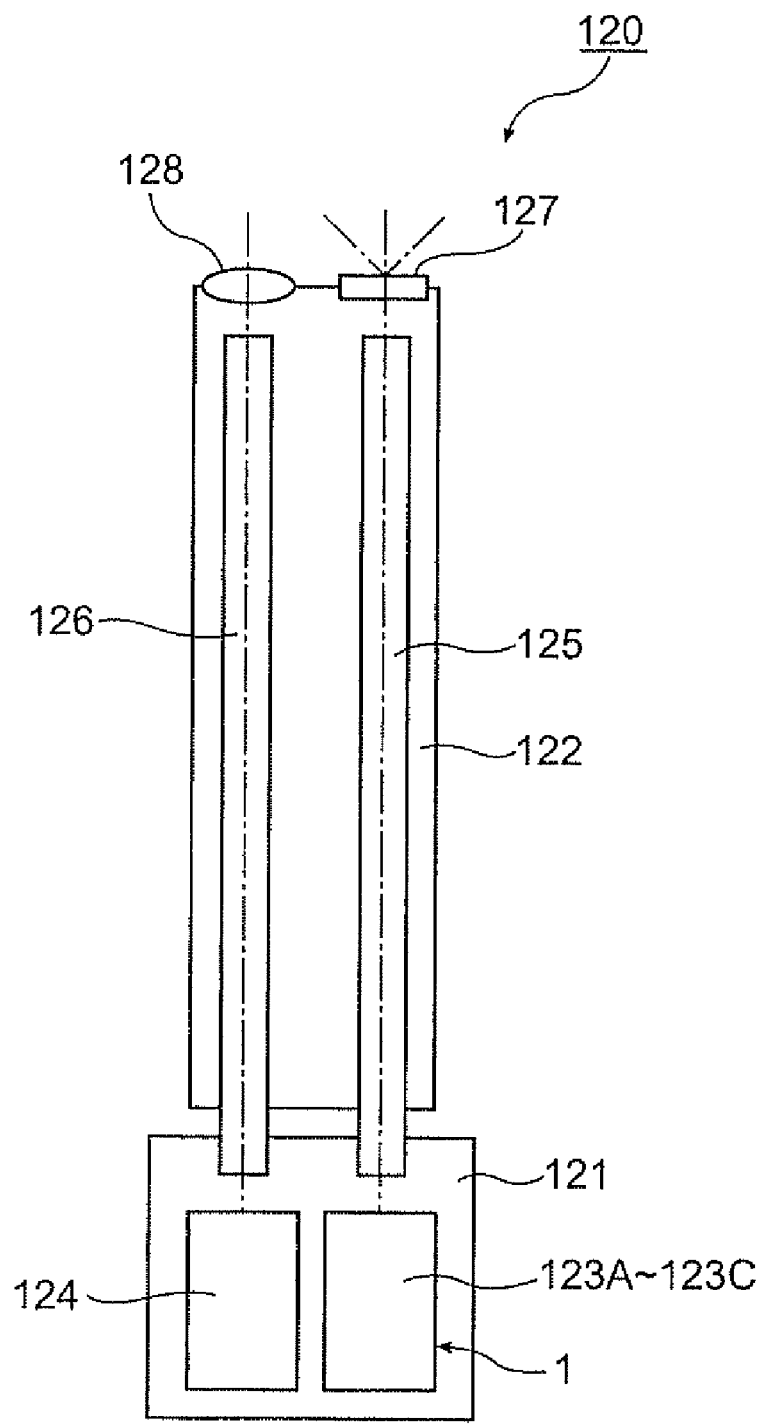
FIG. 16 is a schematic configuration diagram showing a monitor device equipped with the multi-wavelength light source device.

Further, the multi-wavelength light source device 1 is also used as, for example, a light source device of a monitor device 120 as shown in FIG. 16. Here, FIG. 16 is a schematic configuration diagram showing the monitor device.

As shown in FIG. 16, the monitor device 120 is provided with a main body section 121, and a light transmission section 122 connected to the main body section 121.

The main body section 121 is provided with red, green, and blue light source devices 123A through 123C, and an imaging element 124.

As each of the red, green, and blue light source devices 123A through 123C, either one of the light source devices 11 through 13, 30, 40, 50, 60, 70, 80, and 90 described above is used. It should be noted that it is not necessary that all of the red, green, and blue light source devices 123A through 123C have the same configurations, and it is possible to use any of the light source devices 11 through 13, 30, 40, 50, 60, 70, 80, and 90 in combination.

Further, the light transmission section 122 is provided with a light guide 125 connected to the main body section 121 at the base end thereof, and for guiding the light beams emitted from the red, green, and blue light source devices 123A through 123C to the tip thereof, and a light guide 126 for guiding an obtained image from the tip thereof to the imaging element 124. These light guides 125, 126 are each formed of a bundle of optical fibers. Further, the light transmission section 122 is provided with a diffusion plate 127 disposed on the tip of the light transmission section 122, and for emitting the light beams, which are respectively emitted from the red, green, and blue light source devices 123A through 123C, from the tip in a diffused condition, and an imaging lens 128 to which the reflection of the light emitted from the diffusion plate 127 is input.

Illumination Device

Figure 17:
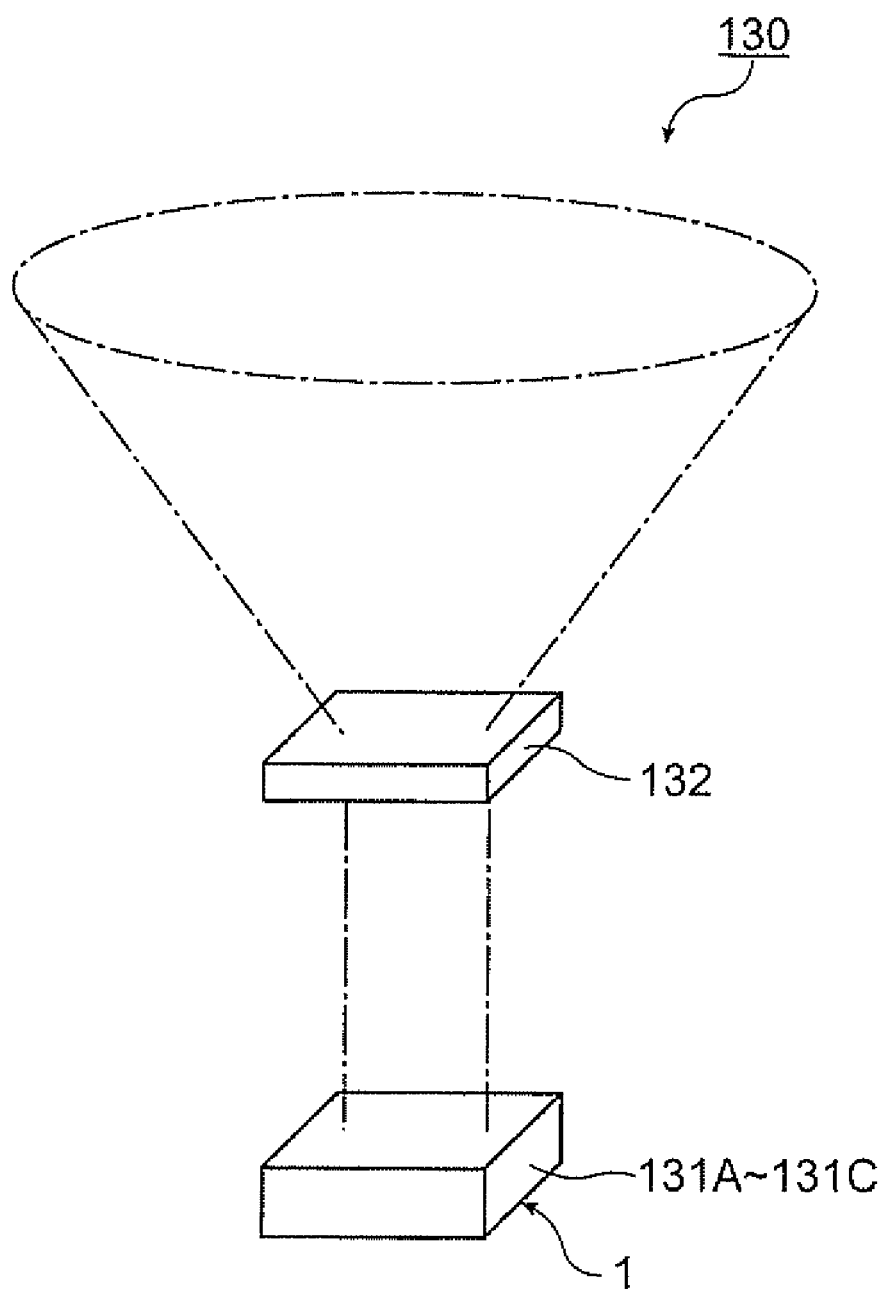
FIG. 17 is a schematic configuration diagram showing an illumination device equipped with the multi-wavelength light source device.

Further, the multi-wavelength light source device 1 is also used as, for example, a light source device of an illumination device 130 as shown in FIG. 17. Here, FIG. 17 is a schematic configuration diagram showing the illumination device.

As shown in FIG. 17, the illumination device 130 is provided with red, green, and blue light source devices 131A through 131C, and a diffusion member 132 for diffusing the light beams emitted from the red, green, and blue light source devices 131A through 131C.

As each of the red, green, and blue light source devices 131A through 131C, either one of the light source devices 11 through 13, 30, 40, 50, 60, 70, 80, and 90 described above is used. It should be noted that it is not necessary that all of the red, green, and blue light source devices 131A through 131C have the same configurations, and it is possible to use any of the light source devices 11 through 13, 30, 40, 50, 60, 70, 80, and 90 in combination.

It should be noted that the invention is not limited to the embodiment described above, but various modifications can be executed thereon within the scope or the spirit of the invention.

For example, the wavelength of the red light can be equal to or greater than 658.5 nm.

Further, the spectral line width of the emitted light beams can be other values providing the values are equal to or greater than 0.2 nm.

Further, although the wavelengths of the light beams emitted from the respective light emitting elements are assumed to be λ0, they can be different from each other.

Further, although the light emitting elements are disposed linearly, they can be disposed in other forms such as a planar shape.

Further, as the light emitting elements, an edge-emitting laser or a surface emitting laser can also be used.

Further, although the state changing section controls the selection wavelengths and the conversion wavelengths by heating or cooling, or providing distortion to the wavelength selection element or the wavelength conversion element, it is also possible to adopt a configuration of controlling the selection wavelengths or the conversion wavelengths by changing other physical states of the wavelength selection element or the wavelength conversion element.

Further, the dispersing section can be provided with a configuration in which the wavelengths of the light beams emitted from the respective light emitting elements satisfy the relationships described above by controlling the temperatures of the light emitting elements themselves using, for example, a Peltier element.

The entire disclosure of Japanese Patent Application No. 2007-294316, filed Nov. 13, 2007 is expressly incorporated by reference herein.

What is claimed is:

1. A multi-wavelength light source device comprising:
   three light source devices for respectively emitting a red light beam, a green light beam, and a blue light beam,
   wherein the light source device includes
      a plurality of light emitting elements, and
      a dispersing section making wavelengths of light beams emitted from the respective light emitting elements different from each other,
   a spectral line width of the emitted light beam in each of the light source devices is equal to or greater than 0.2 nm,
   a wavelength of the red light beam in the light source device for emitting the red light beam is greater than 612 nm,
   a wavelength of the green light beam in the light source device for emitting the green light beam is greater than 525 nm and smaller than 538 nm, and
   a wavelength of the blue light beam in the light source device for emitting the blue light beam is greater than 465 nm and smaller than 468 nm.

2. The multi-wavelength light source device according to claim 1,
   wherein the spectral line width of the emitted light beam in each of the light source devices is equal to or greater than 0.5 nm.

3. The multi-wavelength light source device according to claim 2,
   wherein the spectral line width of the emitted light beam in each of the light source devices is equal to or greater than 1.0 nm.

4. The multi-wavelength light source device according to claim 1,
   wherein the wavelength of the red light beam in the light source device for emitting the red light beam is greater than 612 nm and smaller than 658.5 nm.

5. The multi-wavelength light source device according to claim 1,
   wherein the dispersing section includes a wavelength selection element having a plurality of light entrance areas where the light beams emitted from the light emitting elements enter respectively, and for selectively reflecting a part of a light beam with a predetermined selection wavelength out of each of the light beams, which are emitted from the respective light emitting elements, towards the respective light emitting elements, and transmitting the rest of each of the light beams, which are emitted from the respective light emitting elements, and
   the selection wavelengths in the respective light entrance areas are different from each other.

6. The multi-wavelength light source device according to claim 5,
   wherein the dispersing section includes a state changing section making the selection wavelengths different from each other.

7. The multi-wavelength light source device according to claim 5,
   wherein the wavelength selection element has a wavelength selection film different in film thickness between the light entrance areas.

8. The multi-wavelength light source device according to claim 1,
   wherein the dispersing section includes
      a wavelength conversion element having a plurality of light entrance areas where the light beams emitted from the light emitting elements enter respectively, and for converting a certain wavelength of each of the light beams, which are emitted from the respective light emitting elements, into a predetermined conversion wavelength, and emitting a light beam with the conversion wavelength together with the light beam with the rest of the wavelengths, and
      a wavelength selection element for selectively reflecting a part of the light beam with the conversion wavelength out of the light beam, which is emitted from the wavelength conversion element, towards the respective light emitting elements, and transmitting the rest of the light beam, which is emitted from the wavelength conversion element, and
   the conversion wavelengths in the respective light entrance areas are different from each other.

9. The multi-wavelength light source device according to claim 8,
wherein the wavelength conversion element has repeated structures of domains with polarization inverted to each other along optical axes of the light beams emitted from the respective light emitting elements, and
the widths of the domains in the optical axis direction are different between the light entrance areas from each other.

10. The multi-wavelength light source device according to claim 8,
wherein the dispersing section includes a state changing section that makes the conversion wavelengths different from each other.

11. The multi-wavelength light source device according to claim 10,
wherein the wavelength conversion element has repeated structures of domains with polarization inverted to each other along optical axes of the light beams emitted from the respective light emitting elements, and
the widths of the domains in the optical axis direction in the respective light entrance areas are identical to each other.

* * * * *